Figure 1:
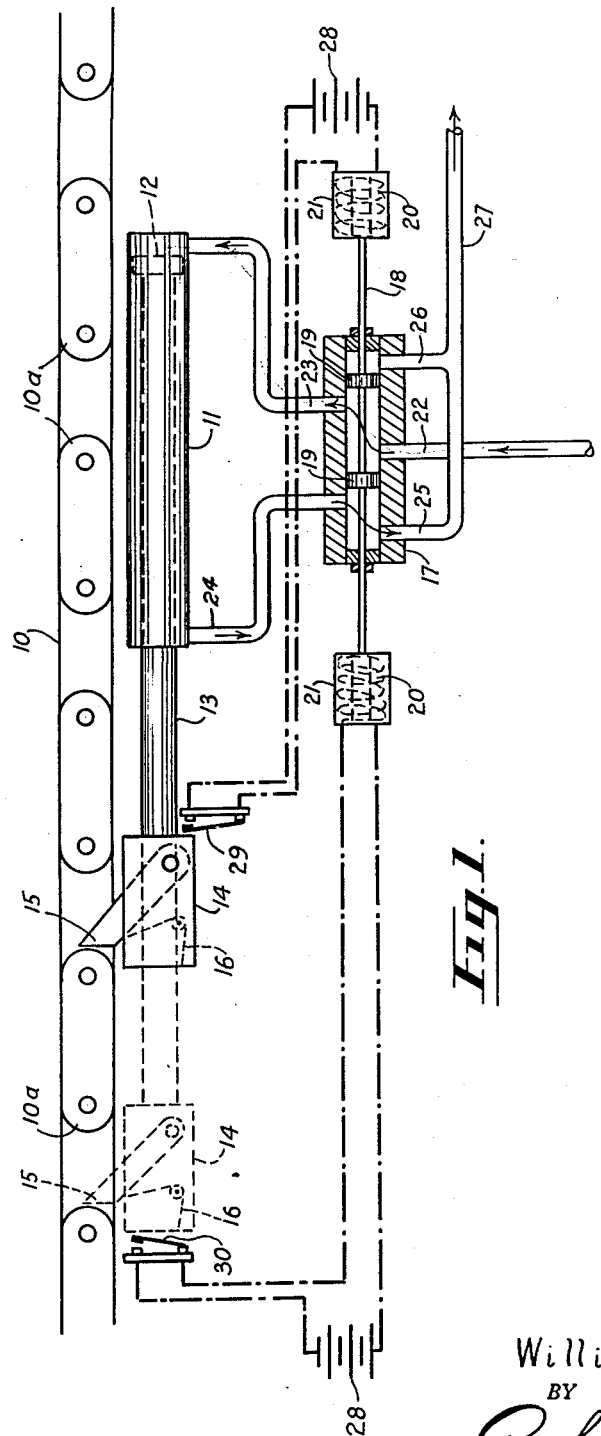

Nov. 14, 1950  W. H. McINNIS  2,529,777
CONVEYER DRIVE
Filed Oct. 23, 1946.

INVENTOR.
William H. McInnis
BY
Ralph Burch
Attorney

UNITED STATES PATENT OFFICE 2,529,777

CONVEYER DRIVE

William H. McInnis, Windsor, Ontario, Canada

Application October 23, 1946, Serial No. 705,157

2 Claims. (Cl. 198—135)

This invention relates to improvements in a conveyor drive. Its primary object being to provide conveyor propulsion means including hydraulic cylinders with cooperating pistons actuated from a source of power.

A further object of the invention is to provide propulsion means as above wherein one or more of the said cylinders may be used at various places along a conveyor drive. A one cylinder unit could be used where a stop and start motion is satisfactory or desired. Two or more cylinders would give a more uninterrupted motion to the conveyor chain. With a multiple cylinder installation with each cylinder moving in controlled sequence a continued uninterrupted motion in the chain is possible.

With these and other objects in view that may appear while the description proceeds the invention consists in the novel construction and arrangement of parts as hereinafter more specifically set forth, claimed and shown in the accompanying drawings forming part of this application and in which:

Fig. 1 is a diagrammatic view of my invention.

Referring more in detail to the drawings in which similar reference characters designate corresponding parts it will be seen the invention consists of an endless conveyor chain 10 composed of a plurality of similar links 10a. Said conveyor chain is mounted freely on rollers at each end.

The conveyor chain motive power consists of cylinder 11 having a piston 12 reciprocally mounted therein. Said piston having a connecting rod 13 protruding through one end thereof and a dog casing 14 is secured thereon. A dog 15 is pivotally mounted in said casing and protrudes upward from a slot in the top side thereof. Said dog is normally held in the position by a spring member 16 likewise mounted in said casing. The cylinder is mounted parallel to said conveyor chain and adjacent thereto so that the dog will engage one of the chain links 10a as it protrudes upward from the casing.

The piston is moved in the cylinder by means of water, air, steam or the like delivered under pressure through a control valve 17. Said valve consists of a cylindrical body having a rod 18 passing concentrically therethrough. Two pistons 19 are fixed thereon in spaced apart relation to each other. The rod 18 is motivated by solenoids 20 on each end which have electric coils 21 so that when either of the coils is energized the solenoid will be drawn therein thus moving the pistons. Intake and outlet ports are constructed in the valve. A central pipe 22 has connection with the intake port through which the fluid enters the valve and oppositely disposed thereto are two pipes 23 and 24, which conduct the liquid to the cylinder. It will be seen these pipes connect to opposite ends of the cylinder and become alternately intake and outlet depending on the direction of travel of the piston. Two outlet pipes 25 and 26 are likewise connected to the valve and lead to a common outlet pipe 27.

The electrical circuit is activated by battery 28 or other source of power and controlled by spring switches 29 and 30. Said switches are arranged to be contacted and operated by the movement of the dog casing which engages the switch arm at the end of each stroke and closes the same to complete the circuit and actuate the solenoid and consequently the control valve.

From the foregoing it will be seen that when liquid enters the control valve 17 as in the position shown will be directed by pipe 23 to the cylinder 11 and force the piston 12 to move the connecting rod 13 and consequently the dog 15 and casing 14 from the position shown in full lines to the position shown in dotted lines.

As the dog is held upward by the spring 16 it is in engagement with the chain link and therefore moves the conveyor chain therewith. When the dog casing reaches the end of the stroke it engages the switch 30 and closes the same. This in turn energizes the solenoid coil and causes the valve piston to be moved to the alternate position. Thus the direction of the flow from the valve to the cylinder is reversed which causes the piston to be moved in the opposite direction and consequently the dog brought back to the position as at the start. As the dog casing resumes this position the switch 29 is closed and the opposite solenoid activated which again moves the valve piston and the cycle begins again.

It is believed that the construction and advantages of the structure shown may be apparent from the foregoing paragraphs taken in conjunction with the accompanying drawings without further detailed description.

While the preferred embodiment of the invention has been disclosed it is understood that minor changes in the details of construction, combination and arrangement of co-operating parts may be resorted to within the scope of what is claimed without departing from the spirit of the invention.

I claim:

1. A conveyor drive comprising a fluid actuated piston mounted in parallel relation to a conveyor, valve means controlling the flow of fluid to said piston for reciprocating the same, solenoids controlling said valve means, a connecting rod connected to said piston, a casing at the end of said rod, a drive dog carried by said casing adapted to operatively engage the conveyor when moved in one direction, and spaced electric switches in the path of movement of said casing, said switches being electrically connected with said solenoids and operated by said casing to alternately energize said solenoids.

2. A conveyor drive comprising a fluid actuated piston mounted in parallel relation to a conveyor, valve means controlling the flow of fluid to said piston for reciprocating the same, a pair of solenoids controlling said valve means, an electric circuit for each of said solenoids, a connecting rod connected to said piston, a drive dog carried by said rod adapted to operatively engage the conveyor when moved in one direction, an electric switch interposed in each of said electric circuits disposed at opposite ends of the path of travel of said drive dog, and means carried by said connecting rod adapted to close said switches at the end of each stroke of said rod to alternately energize said solenoids.

WILLIAM H. McINNIS.

REFERENCES CITED

The following references are of record in the file of this patent:

UNITED STATES PATENTS

| Number | Name | Date |
|---|---|---|
| 897,676 | Thompson | Sept. 1, 1908 |
| 1,522,116 | Gray et al. | Jan. 6, 1925 |
| 1,715,141 | Mathieson | May 28, 1929 |
| 1,934,835 | Weiss | Nov. 14, 1933 |
| 1,946,452 | Bridges | Feb. 6, 1934 |
| 2,021,066 | Huxford et al. | Nov. 12, 1935 |
| 2,458,290 | Monroe | Jan. 4, 1949 |